United States Patent [19]

Turney

[11] Patent Number: 5,600,670
[45] Date of Patent: Feb. 4, 1997

[54] DYNAMIC CHANNEL ALLOCATION FOR GPS RECEIVERS

[75] Inventor: Paul F. Turney, Santa Clara, Calif.

[73] Assignee: Trimble Navigation, Ltd., Sunnyvale, Calif.

[21] Appl. No.: 363,385

[22] Filed: Dec. 21, 1994

[51] Int. Cl.⁶ .................... H04B 15/00; H04K 1/00; H04L 27/30
[52] U.S. Cl. ................... 375/208; 375/200; 375/343
[58] Field of Search .................... 375/200, 201, 375/206, 207, 208, 209, 210, 236, 343; 370/18, 107, 105, 108; 455/3.2, 11.1, 12.1, 13.2, 39, 54.1, 49.1

[56] References Cited

U.S. PATENT DOCUMENTS

| | | | |
|---|---|---|---|
| 4,550,414 | 10/1985 | Guinon et al. | 375/1 |
| 4,821,294 | 4/1989 | Thomas, Jr. | 375/96 |
| 4,894,842 | 1/1990 | Broekhoves et al. | 375/200 |
| 5,101,416 | 3/1992 | Fenton et al. | 375/1 |
| 5,414,729 | 5/1995 | Feston | 375/209 |
| 5,420,593 | 5/1995 | Niles | 342/357 |

Primary Examiner—Stephen Chin
Assistant Examiner—Bryan E. Webster
Attorney, Agent, or Firm—Patrick T. King

[57] ABSTRACT

The channels of a GPS receiver system are dynamically allocated during acquisition mode to hierarchically chain a slave channel module to a master channel. Each channel circuit includes two correlators, where each correlator receives a digitized received GPS signal and a delayed local PRN reference code signal to provide an output signal to an accumulator. During acquisition, the system provides two correlator channels where each channel includes two correlators for a total of four correllators. A PRN reference code signal is progressively delayed to provide a sequence of progressively delayed PRN reference code signals, where one of the sequence of progressively delayed PRN reference code signals are applied to each of the correlators. Each correlator channel also includes a digital mixer which receives a digitized GPS IF signal and a digital carrier reference signal and which provides the digitized received GPS signal.

5 Claims, 7 Drawing Sheets

DYNAMIC CHANNEL ALLOCATION FOR GPS RECEIVERS

BACKGROUND OF THE INVENTION

1. Field of the Invention

This invention relates to global positioning systems and more particularly to techniques for improving the acquisition time of such systems.

2. Prior Art

A Satellite Positioning System (SATPS) is a system of satellite signal transmitters, with receivers located on the Earth's surface or adjacent to the Earth's surface, that transmits information from which an observer's present location and/or time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

An SATPS antenna receives SATPS signals from three or more (preferably four or more) SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90, incorporated by reference herein.

Each GPS satellite transmits two spread spectrum, L-band carrier signals: an L1 signal having a frequency f1=1575.42 MHz and an L2 signal having a frequency F2=1227.6 MHz. These two frequencies are integral multiples of f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and the P-code. The L2 signal from each satellite is BPSK modulated by only the P-code. The nature of these PRN codes is described below.

One motivation for the use of two carrier signals L1 and L2 is to allow partial compensation for propagation delay of such a signal through the ionosphere, which delay varies approximately as the inverse square of signal frequency f (delay $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of the plurality of GPS satellite signals for determining an observer's position and providing navigation information. A signal transmitted by a particular GPS signal is selected by generating and matching, or correlating, the PRN code for that particular satellite. All PRN are known and are generated or stored in GPS satellite signal receivers carried by ground observers. A first PRN code for each GPS satellite, sometimes referred to as precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A code for any GPS satellite has a length of 1023 chips or time increments before this code repeats. The full P-code has a length of 259 days, with each satellite transmitting a unique portion of the full P-code. The portion of P-code for a given GPS satellite has the length of precisely one week (7.000 days) before this code portion repeats. Accepted methods for generating C/A-code and P-code are set forth in the document GPS Interface Control Document ICD-GPS-200, which is provided from Rockwell International Corporation, Satellite Systems Division, Revision A, 26 Sep. 1984, which is incorporated by reference herein.

The GPS satellite bit stream includes navigational information on the ephemeris of the transmitting GPS satellite and an almanac for all GPS satellites, with parameters providing corrections for Ionospheric signal propagation delays suitable for single frequency receivers and for an offset time between satellite clock time and true GPS time. The navigational information is transmitted at a rate of 50 BAUD. A useful discussion of the GPS and techniques for obtaining position information from the satellite signals is found in Tom Logsdon, *The NAVSTAR Global Positioning System*, Van Nostrand Reinhold, New York, 1992.

A second configuration for global positioning is the Global Orbiting Navigation Satellite System (GLONASS), Placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three planes are separated from each other by multiples of 120° longitude. The GLONASS circular orbits have smaller radii, about 25,510 kilometers, and a satellite period of revolution of 8/17 of a sidereal day (11.26 hours). A GLONASS Satellite and a GPS satellite will thus complete 17 and 16 revolutions, respectively, around the Earth every 8 days. The GLONASS system uses two carrier signals L1 and L2 with frequencies of f1=1.602+9k/16) GHz and f2=1.246+7k/16)GHz, where k(=0, 1, 2, . . . , 23) is the channel or satellite number. These frequencies lie in two bands at 1.597–1.617 GHz (L1) and 1,240–1.260 GHz (L2). The L1 code is modulated by a C/A-code (chip rate=0.511 MHz) and by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to Satellite Positioning System or SATPS herein refers to a Global Positioning System, to a Global Orbiting Navigation System, and to any other compatible satellite-based system that provides information by which and observer's position and time can be determined, all of which meets the requirements of the present invention.

A satellite Positioning System (SATPS), such as the Global Positioning System (GPS) or the Global Orbiting Navigation System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by SATPS.

U.S. Pat. No. 5,101,416, titled Multi-Channel Digital Receiver For Global Positioning System by Fenton et al. and assigned to NovAtel Communications Ltd. discloses a receiver for pseudo random noise (PRN) encoded signals consisting of a sampling circuit and multiple channel circuits. Each channel circuit includes a carrier and code synchronizing circuit and two digital correlators with dynamically adjustable code delay spacing. The two correlators compare the digital samples with a locally generated PRN code to produce early, late, and/or punctual correlation signals which are used to adjust the local PRN code.

U.S. Pat. No. 4,550,414, titled Spread Spectrum Adaptive Code Tracker by Guinon et al, and assigned to Draper Laboratory discloses a pseudo-noise code-tracking spread spectrum receiver able to quickly acquire and track incoming signals. The receiver includes an adaptive weighting system for the outputs of parallel-fed correlator channels in which the weighting system automatically detects the degree of correlation in each channel, sets the detector characteristics to increase the weight for a correlator channel exhibiting a high degree of correlation, and decreases to zero the weights on all others.

A "channel" for a GPS receiver is defined as a circuit which is capable of taking the digital output samples of the sampling analog-to-digital converter (ADC) and processing the signal transmitted from a satellite which is presently in view. The signal which is digitally sampled includes an in-phase (I) signal and a quadrature (Q) signal. The channel process the samples I and Q signals transmitted by a particular satellite. Each channel uses a carrier/code synchronizing circuit which tracks the frequency and phase of a PRN encoded carrier signal by using a expected Doppler offset unique to a desired satellite. A channel also correlates a locally generated Pseudo-Random code reference signal with a Doppler-rotated replica of the carrier. Two correlators are connected with a delay-clock arrangement to keep the locally generated PRN code precisely aligned with the code modulated onto the received satellite signal. The resulting decoded data includes the ephemeris of the satellite, time of day, status information, and the locally generated PRN code phase and carrier phase measurements.

A typical multi-channel module for a GPS receiver typically includes six channel circuits. Each of the channel circuits includes a carrier and code synchronizing circuit as well as multiple digital correlators. The correlators compare the digital samples with a locally generated PRN code to produce early, late, and/or punctual correlation signals which are used to adjust a local PRN code.

A GPS receiver typically uses 4 or more satellite signals for navigation. For acquisition, a GPS receiver may use one or more satellite signals during acquisition or re acquisition. This means that when fewer satellites are being used, there are usable channels that are idle, unused channels. Consequently, the need has arisen for more efficient use of these unused channels in a GPS system.

SUMMARY OF THE INVENTION

The invention permits dynamically increasing the number of channels used for acquiring a particular satellite signal during an acquisition mode of operation. If a channel and its two correlators are not being otherwise used, the channel can be used to provide additional correlators for assisting in acquisition of a particular satellite signal. Four satellites are needed for navigation. One or more satellites may be used for acquisitions. Only one channel per satellite is required to maintain continuous tracking. According to the invention, the unused channels are then available for reassignment to assist other channels operating in an acquisition mode.

It is therefore an object of the invention to provide for more efficient and effective use of the correlator channels of a GPS receiver in the acquisition mode of operation.

In accordance with this and other objects of the invention, the invention provides that unused channels of a GPS receiver system are dynamically allocated to assist another channel during acquisition mode. This is accomplished by hierarchically chaining a plurality of slave channel circuits in series with one or more master channels. Each channel circuit includes at least two correlators.

The invention provides a system for improving acquisition of a GPS signal. The system includes at least two correlator channels where each channel, in turn, includes two correlators. The two channels provide four correllators, where each correlator receives a digitized received GPS signal and where each of the correlators provides an output signal to an accumulator. A PRN reference code signal is progressively delayed to provide a sequence of progressively delayed PRN reference code signals. One of the sequence of progressively delayed PRN reference code signals are applied to each of the correlators.

The correlators are grouped by twos into channels. Each channel includes a digital mixer having a first input terminal for receiving a digitized GPS IF signal, a second input terminal for receiving a digital carrier reference signal and an output terminal at which is provided the digitized received GPS signal.

According to another aspect of the invention, a GPS channel system is provided for acquiring a GPS signal. The system includes a first channel module which has a first correlator which receives a digitized received GPS signal and which receives a local PRN reference code signal. The first correlator provides an output signal to a first accumulator.

The first channel module also includes a similar second correlator which receives the digitized received GPS signal and which receives a first delayed local PRN reference code signal to provide an output signal to a second accumulator.

Means are provided for additionally delaying the first delayed local PRN reference code signal to provide a second delayed PRN reference code signal. A second channel module receives the digitized received GPS signal and the second delayed local PRN reference code signal to provide an output signal to a third accumulator.

Means are provided for additionally delaying the second delayed local PRN reference code signal to provide a third delayed PRN reference code signal. The second channel module also includes a fourth correlator which receives the digitized received GPS signal and the third delayed local PRN reference code signal to provide an output signal to a fourth accumulator.

The system further includes switch means for applying the third delayed PRN reference code signal to the second input terminal of the third correllator when the GPS channel system is in an acquisition mode of operation. In a tracking mode of operation, the switch means includes means for applying another PRN reference code signal to the second input terminal of the third correllator when the GPS channel system is in a tracking mode of operation.

The system further includes a first digital mixer which receives a digitized IF signal and a digital carrier reference signal to provide the digitized received GPS signal for the first channel module. The system also includes a second digital mixer which receives a digitized IF signal and the digital carrier reference signal to provide the digitized received GPS signal for the second channel module. Switch means apply the digital carrier reference signal to the second input terminal of the second digital mixer when the GPS channel system is in an acquisition mode of operation. These switch means include means for applying another digital carrier reference signal PRN to the second input terminal of the second digital mixer when the GPS channel system is in a tracking mode of operation.

The invention includes a method for improving acquisition of a GPS receiver system during an acquisition mode of operation. The method includes the steps of: hierarchically chaining a plurality of channel circuits in series during acquisition mode, where each channel circuit includes two correlators; progressively delaying a PRN reference code signal to provide a sequence of progressively delayed PRN reference code signals; and applying one of the sequence of progressively delayed PRN reference code signals to each of the correlators.

The invention includes the method of dynamically allocating otherwise unused correlator channels of a GPS receiver for improving acquisition of a GPS signal, where a correlator channel includes two correlators. The method includes the steps of providing a local PRN reference code signal; correlating a digitized received GPS signal with the local PRN reference code signal in a first correlator of a first channel and providing an output signal to a first accumulator; delaying the local PRN reference code signal to provide a first delayed PRN reference code signal; correlating the digitized received GPS signal with the first delayed local PRN code signal in a second correlator of the first channel and providing an output signal to a second accumulator; delaying the first delayed local PRN reference code signal to provide a second delayed PRN reference code signal; determining that a second channel having a third and a fourth correlator are unused and available for assisting the first and second correlators of the first channel in acquiring a GPS signal; correlating the digitized received GPS signal with the second delayed local PRN code signal in the third correlator and providing an output signal to a third accumulator; delaying the second delayed local PRN reference code signal to provide a third delayed PRN reference code signal; correlating the digitized received GPS signal with the third delayed local PRN code signal in the fourth correlator and providing an output signal to a fourth accumulator.

The method further includes the step of applying the third delayed PRN reference code signal through a switch to the third correllator when the GPS channel system is in an acquisition mode of operation and when the third correlator is determined to be unused and available for assisting the first and second correlators in acquiring a GPS signal. The method also includes the step of applying another PRN reference code signal through the switch to the third correllator when the GPS channel system is in a tracking mode of operation. The method additionally includes step of mixing a digitized IF signal and a digital carrier reference signal to provide the digitized received GPS signal for the first and second correlators; and the step of mixing the digitized IF signal and the digital carrier reference signal to provide the digitized received GPS signal for the third and fourth correlators.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
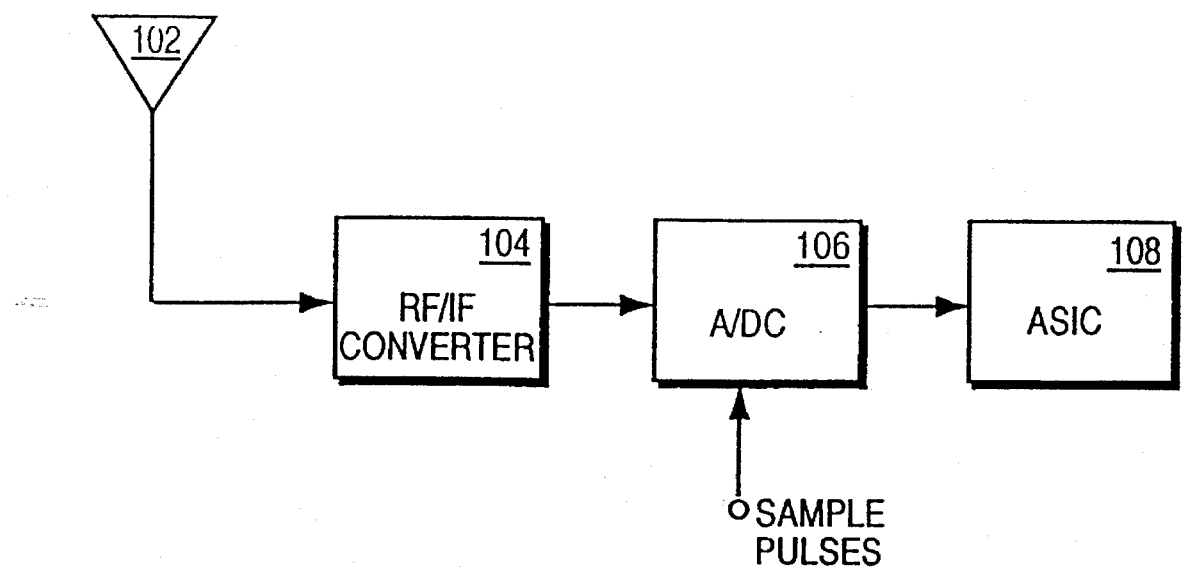
FIG. 1 is a block diagram of a multi-channel GPS receiver system.

FIG. 1 is a block diagram of a multi-channel GPS receiver system 100. The system 100 includes an antenna 102, RF/IF down converter 104, a sampling analog-to-digital converter (ADC) 106, and an ASIC multi-channel module 108.

A channel is a circuit which takes the digital output samples of the sampling analog-to-digital converter (ADC) 106 and processes the information transmitted by a satellite presently in view of the antenna 102. The signal which is sampled is a composite GPS signal. The channel processes the samples of the composite signal transmitted by a particular satellite. Each channel uses a carrier/code synchronizing circuit which tracks the frequency and phase of a PRN encoded carrier signal by using a expected Doppler offset unique to a desired satellite. A channel also correlates a locally generated PRRN code reference signal with a Doppler-rotated replica of the carrier. In the tracking mode, two correlators are connected with a delay-clock arrangement to keep the locally generated PRN code aligned with the code modulated onto the received satellite signal. The resulting decoded data includes the ephemeris of the satellite, time of day, status information, and the locally generated PRN code phase and carrier phase measurements The multi-channel ASIC module 108 includes a number of channel circuits. Each of the channel circuits includes a carrier and code synchronizing circuit as well as multiple digital correlators. The correlators compare the digital samples with a locally generated PRN code to produce early, late, and/or prompt correlation signals which are used to adjust a local PRN code.

Figure 2:
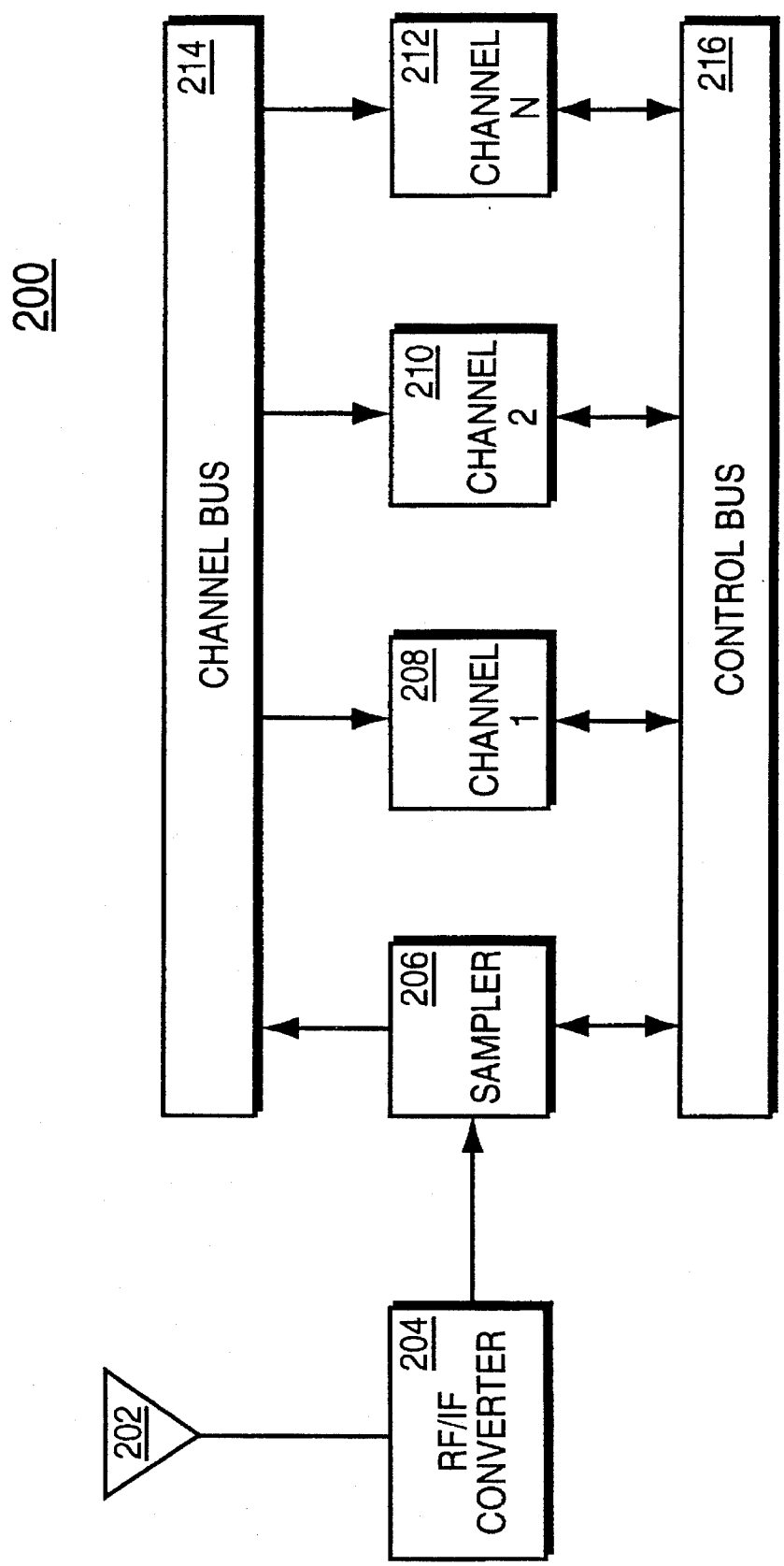
FIG. 2 is a block diagram of a multi-channel GPS receiver system having a number of channel circuits connected in parallel to a digital sampler through a channel bus.

FIG. 2 shows a multi-channel GPS receiver system 200. The system 200 includes an antenna 202, RF/IF down converter 204, and a sampling analog-to-digital converter (ADC) 206. A number of channel modules 208, 210, 212 are connected through a channel bus 214 to the sampler 206. Each of the channel circuits includes a carrier and code synchronizing circuit as well as multiple digital correlators. The correlators compare the digital samples with a locally generated PRN code to produce early, late, and/or prompt correlation signals which are used to adjust a local PRN code. Control signals are applied to the sampler 206 and channel circuits using a control bus 216.

Figure 3:
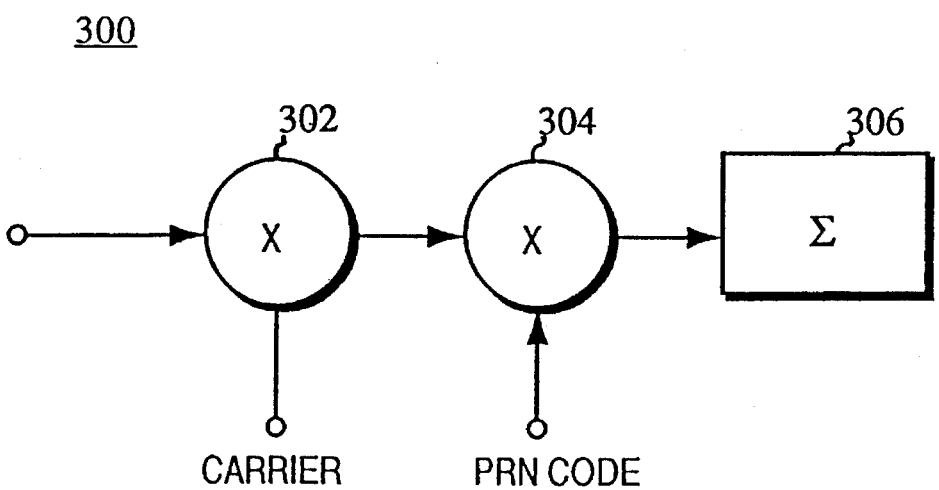
FIG. 3 is a block diagram of a GPS channel circuit which includes a carrier mixer, a correlator, and a summer.

FIG. 3 is a block diagram showing the elements of a channel circuit 300. The channel circuit 300 includes a carrier mixer 302, a correlator 304, and a summer 306. The summer, or accumulator, 306 sums a series of signals having values of +1 and −1.

Figure 4:
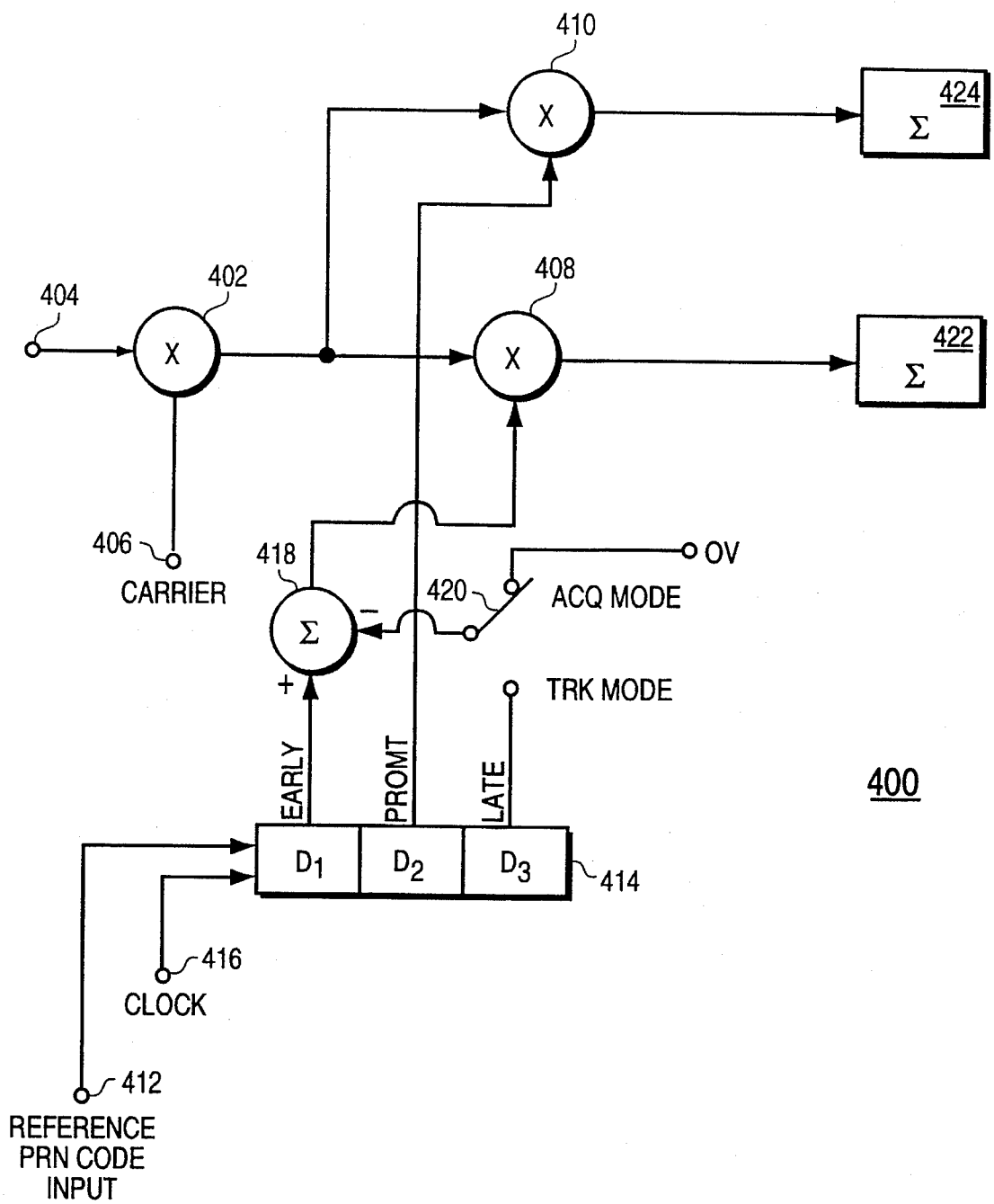
FIG. 4 is a block diagram of a channel circuit which can operate in an acquisition mode and in a tracking mode. When the channel circuit includes a carrier mixer and two pairs of correlators and summers and where the PRN code is provided as early, prompt, and late.

FIG. 4 shows a block diagram of a channel circuit 400. The channel circuit 400 includes a carrier mixer 402 which has an IF input terminal 404 and a carrier input terminal 406. The output signal of the carrier mixer 402 is connected to one input terminal of a first correlator 408 and one input terminal of a second correlator 410.

A reference Pseudo-Random code code signal is applied to an input terminal 412 of a 3-bit shift register 414. The 3-bit shift register is clocked by a clock signal applied to a clock input terminal 416. A first register D1 provides an EARLY reference PRN code signal. A second register D2 provides a PROMPT reference PRN code signal. A third register D3 provides a LATE reference PRN code signal.

The output signal of register D1 is fed to the positive input terminal of an adder 418. The negative input terminal of the adder 418 is connected to an output terminal of a two-position switch 420. An input terminal labeled TRK MODE indicates that the switch 420 connects the LATE reference PRN code signal to the negative input terminal during a tracking mode of channel operation. During an acquisition mode of channel operation, the switch 420 connects no signal to the negative input terminal of the summer 418.

During the acquisition mode, the summer 418 provides an EARLY reference PRN code signal to the other input terminal of the First correlator 408. Also during the acquisition mode, the PROMPT reference PRN code signal from the register D2 is provided to the other input terminal of the second correlator 410.

During the tracking mode, the summer 418 provides an (EARLY LATE) reference PRN code signal to the other input terminal of the first correlator 408. Also during the tracking mode, the PROMPT reference PRN code signal from the register D2 is provided to the other input terminal of the second correlator 410.

In both modes of operation, the output signals of the first and second correlators 408, 410 are provided to the respective input terminals of summers 422, 424.

Figure 5:
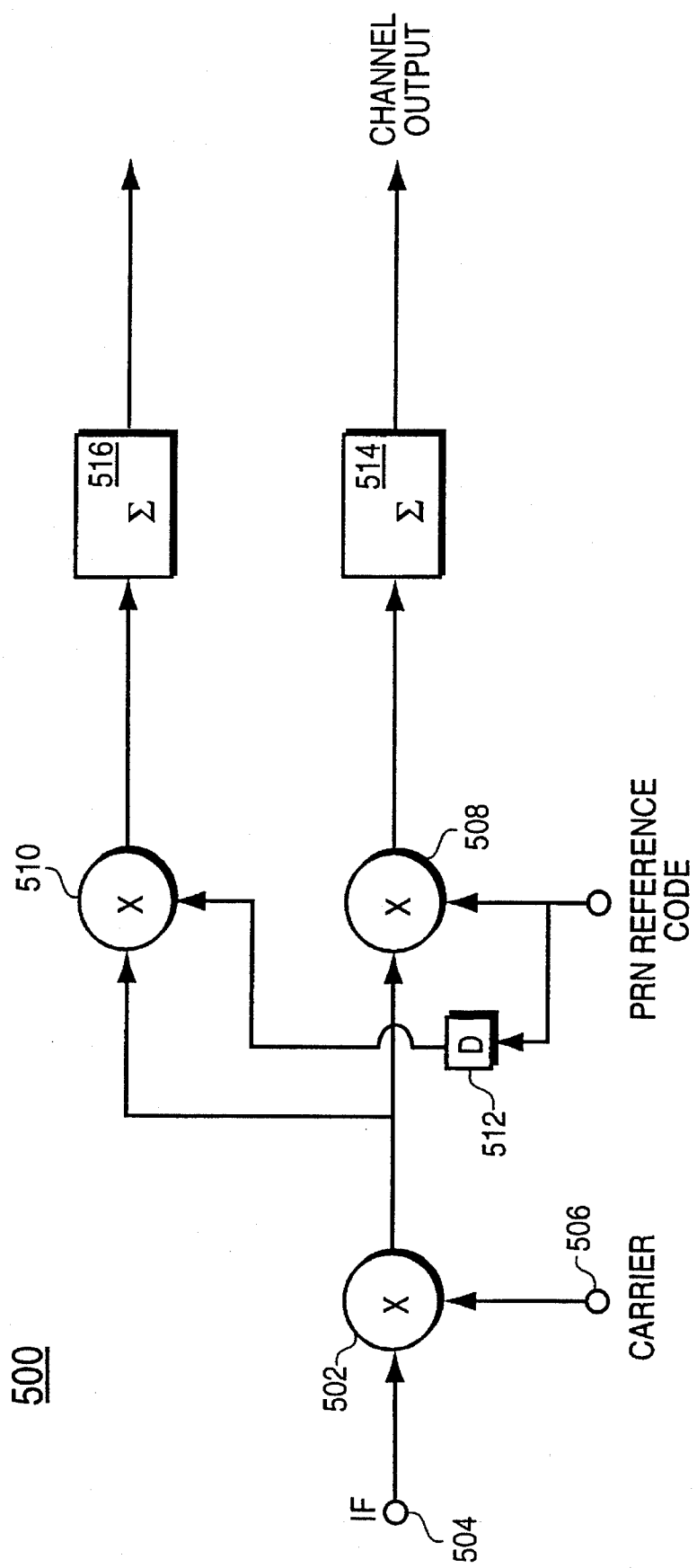
FIG. 5 is a block diagram of a channel circuit in acquisition mode where the channel circuit includes a carrier mixer and two pairs of correlators and summers and where the PRN reference code is delayed to the second correlator.

FIG. 5 is a simplified block diagram of a channel circuit 500 in the acquisition mode of operation. The channel circuit 500 includes a carrier mixer 502 which has an IF input signal terminal 504 and a carrier input terminal 506. The output signal of the carrier mixer 402 is connected to the input terminals of a first correlator 508 and of a second correlator 510. A PRN reference code signal is applied to the other input terminal of the first correlator 508. The PRN reference code signal is delayed in a delay circuit 512 and applied to the other input terminal of the second correlator 510. The output signal of the first correlator 404 is applied to the input terminal of a first accumulator 514. The output signal of the second correlator 510 is applied to the input terminal of a second accumulator 516.

Figure 6:
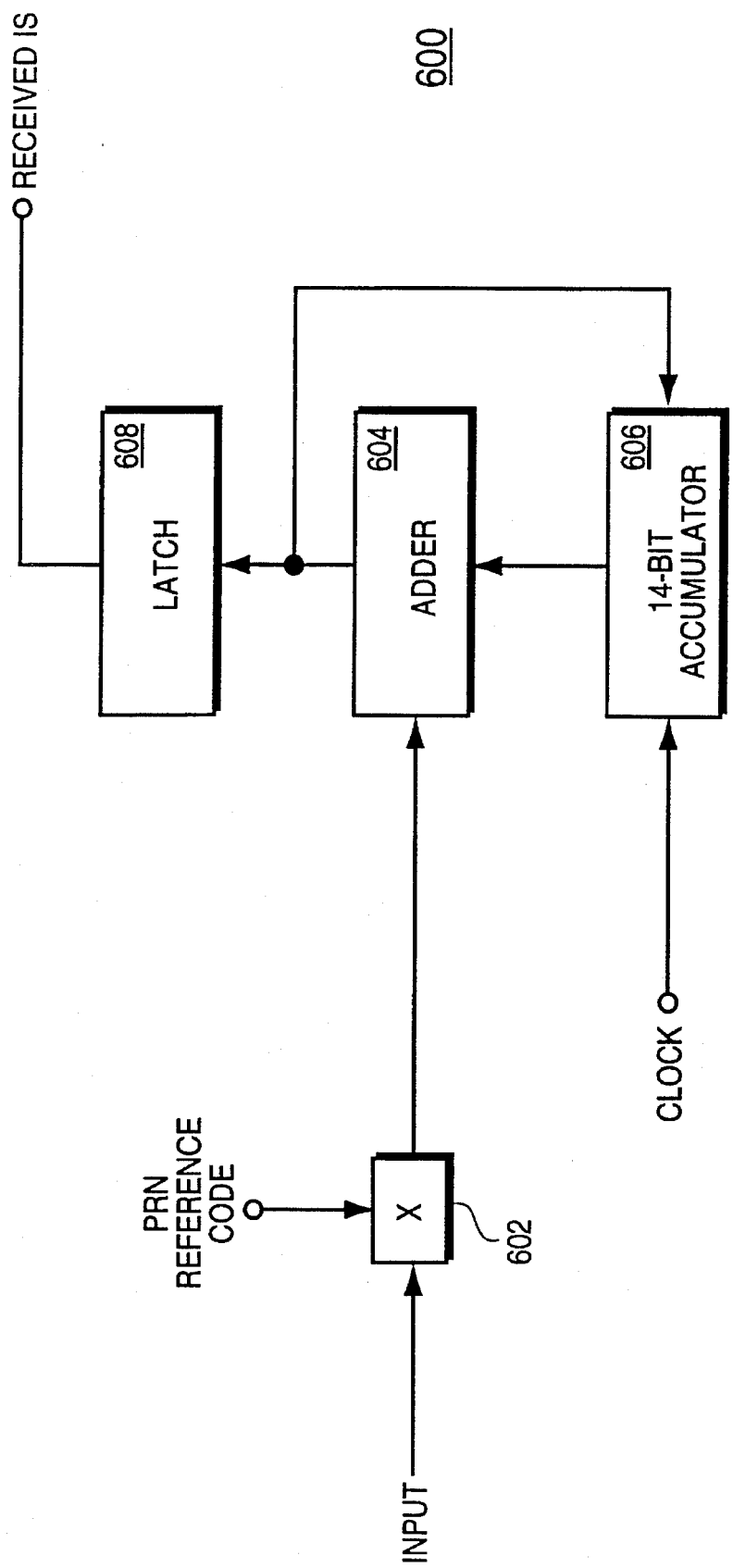
FIG. 6 is a more detailed block diagram of a correlator and summer.

FIG. 6 is a more detailed block diagram of a correlator and summer configuration 600. One input terminal of a correlator 502 receives the digitized output signal of a carrier mixer circuit. A PRN reference code signal is applied to the other input terminal of the correlator 602. The correlator 602 provides an output code signal on a signal line connected to an input terminal of an adder circuit 604. A 14-bit clocked register 606 functions as an accumulator. A latch holds the adder output signal.

Figure 7:
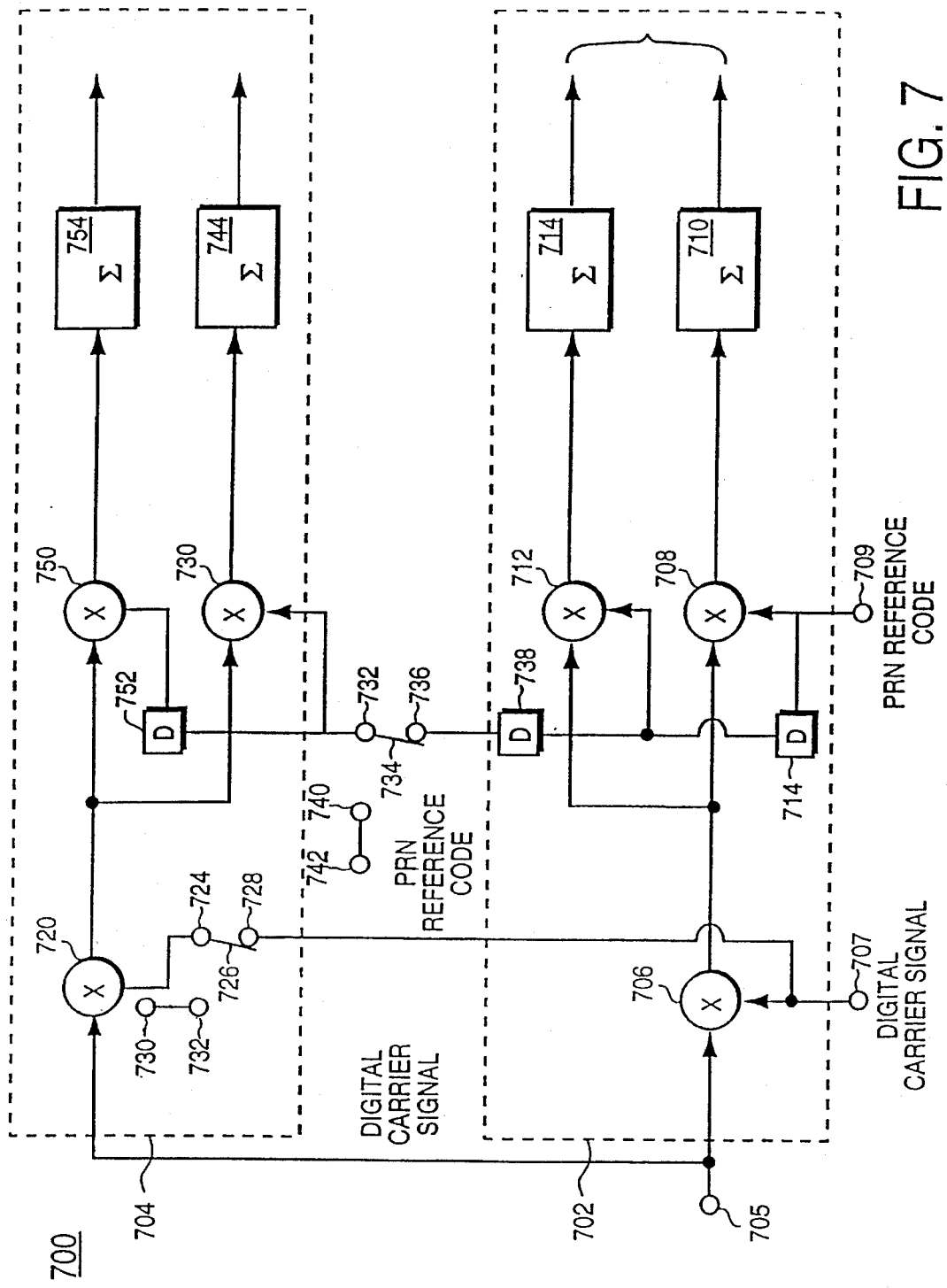
FIG. 7 is a block diagram of a series of two GPS channels chained together to assist in acquisition of a GPS satellite signal.

FIG. 7 shows a switching configuration 700 for coupling, or chaining together, two representative adjacent channels 702, 704 which are operating in the acquisition mode. In this configuration, the various correlators in the acquisition mode are effectively arranged in a "cascade" or "chained" configuration" for an acquisition mode of operation.

The first channel circuit 702 receives an input signal at the IF input terminal 705 which is connected to an input terminal of a carrier mixer 706. A carrier signal is applied to a carrier input terminal 707 of the carrier mixer 702. The output signal of the carrier mixer 706 is connected to one input terminal of a first correlator 708. A locally generated PRN reference code signal is provided at an input terminal 709, which is connected to another input terminal of the first correlator 708. The output terminal of the first correlator 708 is connected to an accumulator circuit 710.

The signal at the output terminal of the carrier mixer 706 is also applied to the input terminal of a second correlator 712. The PRN reference code signal at terminal 709 is delayed in a delay circuit 714 and applied to another input terminal of the second correlator 712. The output signal of the second correlator 712 is applied to the input terminal of a second accumulator 714.

When operating in the acquisition mode of operation, the second channel circuit is connected in series with the First channel circuit 702. The second channel circuit 704 includes a second carrier mixer 720 which has an input terminal connected to the IF signal input terminal 705. The other input terminal of the second carrier mixer 720 is connected to an output terminal 724 of a switch 726. The switch 726 is set to connect an input terminal 728 of the switch 726 to the carrier signal input terminal 707. The switch 726 has another input terminal 730 which is connected to an input terminal 732 for another source of a carrier signal for the channel 704.

The output signal of the carrier mixer 720 is connected to one input terminal of a correlator 730. The other input terminal of the correlator 730 is connected to output terminal 732 of a switch 734. One input terminal 736 of the switch 734 is connected to the output terminal of a delay circuit 738 which further delays the PRN reference codes signal from terminal 709. The other input terminal 740 of the switch 734 is connected to the input terminal 742 for another PRN reference code signal generator. The switch 734 is shown to be set to connect the output terminal 732 of the switch 734 to the output terminal of the delay circuit 738 to provide the further delay to the PRN code signal from the terminal 709. The output terminal of the correlator 730 is connected to an accumulator circuit 744.

The output signal of the carrier mixer 720 is also connected to an input terminal of another correlator 750. The other input terminal of the correlator 750 is connected through another delay circuit 752 to the output terminal 732 of the switch 634, providing even further delay to the PRN code signal from terminal 709. The output terminal of the correlator 750 is connected to an accumulator circuit 754. The arrangement of FIG. 7 provides four correlations for acquisition operation. The various switches described herein are software controlled to provide acquisition and tracking operational modes for the various channels in a system.

Figure 8:
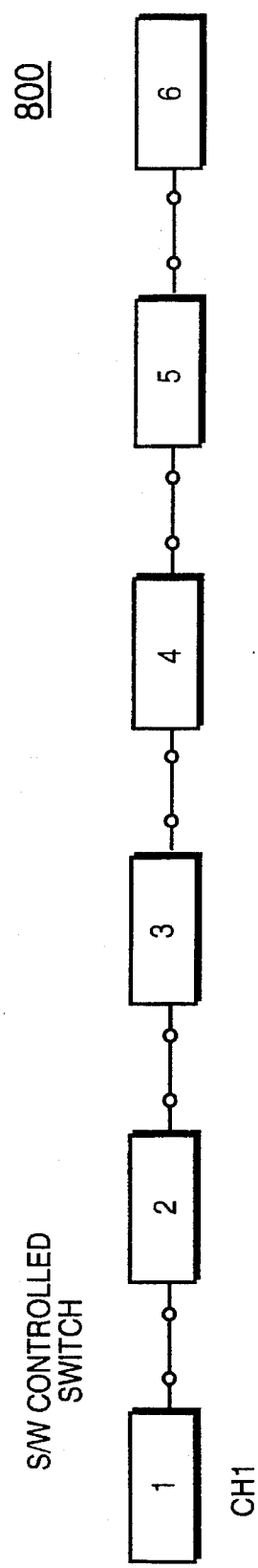
FIG. 8 is a block diagram of six GPS channels, showing how they may be interconnected for acquisition.

FIG. 8 illustrates a series arrangement 800 of six GPS channels, identified as Channels 1–Channel 6. Switches are provided between the channels. The switches, similar to the switches 726 and 734 of FIG. 7, ace used to serially chain Channels 2–6 to Channel 1 to assist Channel 1 in acquisition of a GPS satellite signal. Channel 1 is the "master" channel and the other channels are "slave" channels for this arrangement. Each of the channels includes two correlators as described previously. Therefore, when the correlators are serially chained together as indicated in FIG. 8, fourteen correlators are used serially to provide acquisition of a given GPS satellite signal. In effect, this provides Channel 1 as a super, master channel with five slave channels for a total of fourteen serially connected correlators. When acquisition and lock is made on the given satellite, Channel 1 can revert to operation with only its two correlators and the slave channels can be switched to other uses. The serial arrangement of 14 correlators which are serially strung together can be used to obtain a "timing fix" on a satellite.

Figure 9:
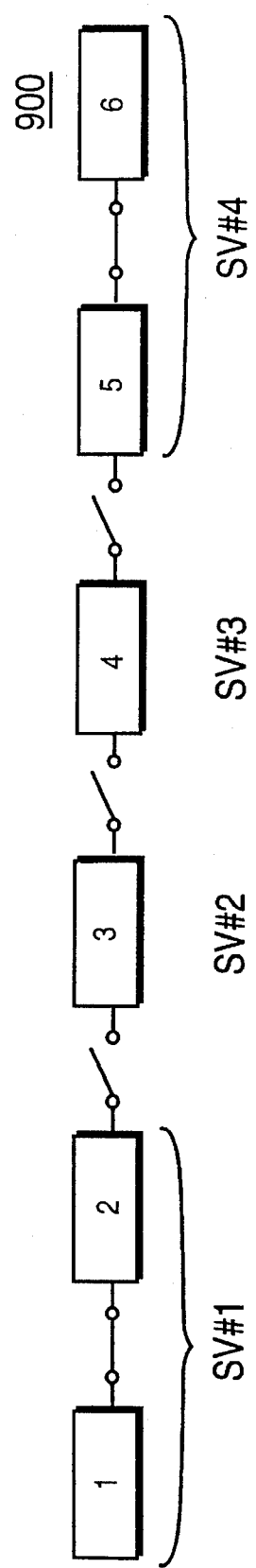
FIG. 9 is a block diagram of six GPS channels, where each of two available channels are connected to another channel to assist the respective other channels with acquisition of a GPS satellite signal.

FIG. 9 shows an arrangement 900 illustrating that any one of Channels 1–6 can be a master and that available neighboring channels can be connected as slave channels. In this illustration Channels 3 and 4 function independently and Channels 1 and 5 respectively functions as masters with Channels 2 and 6 as respective slaves. This provides Channels 1 and 5 each with correlators for acquisition purposes. In this arrangement, channels 1 and 2 operate with Satellite SV1, channel 3 operates with Satellite SV2, channel 4 operates with SV3, and channels 5 and 6 operate with Satellite SV4.

Figure 10:
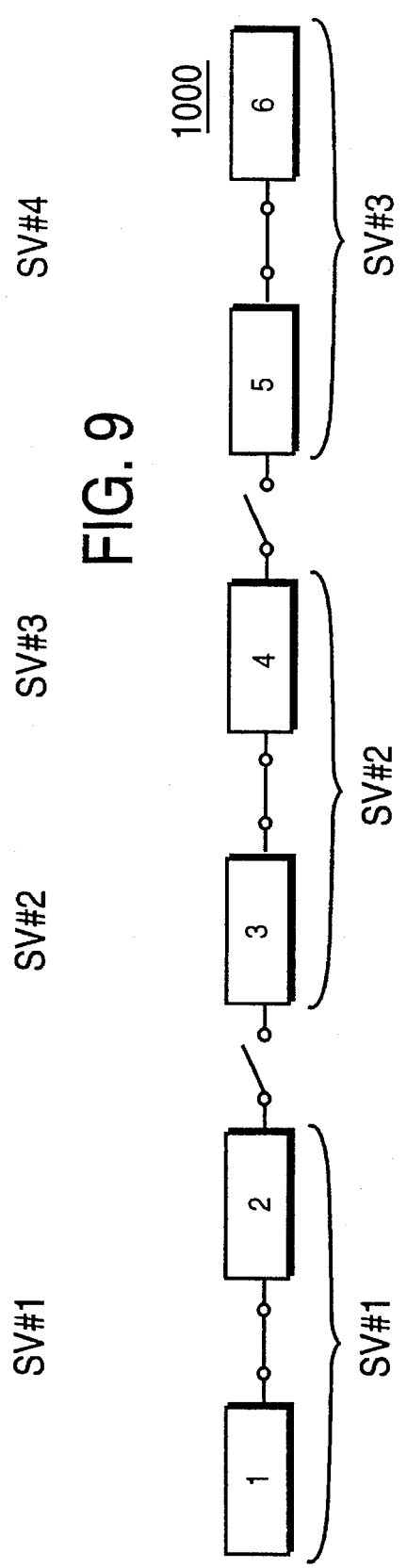
FIG. 10 is a block diagram of the switching configuration for coupling three adjacent channels together.

FIG. 10 shows still another arrangement 1000 illustrating that neighboring Channels can be tied together. In this case, Channel 1 is assisted by Channel 2 in acquiring a signal from Satellite SV1; Channel 3 is assisted by Channel 4 in acquiring Satellite SV2; and Channel 5 is assisted by Channel 6 in acquiring Satellite SV3. Each of Channels 1, 3, and 5 is then provided with four correlators for acquisition.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the claims appended hereto and their equivalents.

I claim:

1. A GPS channel system for acquiring a GPS signal, comprising:

a first channel module including a first correlator which receives a first digitized received GPS signal and a local PRN reference code signal to provide an output signal to a first accumulator;

said first channel module also including a second correlator which receives the first digitized received GPS signal and a first delayed local PRN reference code signal to provide an output signal to a second accumulator;

means for additionally delaying the first delayed local PRN reference code signal to provide a second delayed PRN reference code signal;

a second channel module including a third correlator which receives the first digitized received GPS signal and the second delayed local PRN reference code signal to provide an output signal to a third accumulator;

means for additionally delaying the second delayed local PRN reference code signal to provide a third delayed PRN reference code signal;

said second channel module also including a fourth correlator which receives the first digitized received GPS signal and the third delayed local PRN reference code signal to provide an output signal to a fourth accumulator;

said first channel module also including the second correlator which receives the first digitized received GPS signal and a first delayed local PRN reference code signal to provide an output signal to the second accumulator;

switch means for applying the second delayed PRN reference code signal to the third correlator of the second channel module and for applying the third delayed PRN reference code signal to the fourth correlator of the second channel module when the GPS channel system is in an acquisition mode of operation to allow the third and fourth correlators of the second channel to be switchably connected in a cascaded, serial configuration for the acquisition mode of operation, and wherein the switch means includes means for applying a sequence of other PRN reference code signals to the third and fourth correlator of the second channel module when the GPS channel system is in a tracking mode of operation to allow the third and fourth correlators to be applied to a separate GPS signal.

2. The system of claim 1 including:

a first digital mixer which receives a digitized IF signal and a digital carrier reference signal to provide the first digitized received GPS signal for the first channel module;

a second digital mixer which receives a second digitized IF signal and a second digital carrier reference signal to provide the second digitized received GPS signal for the second channel module; and switch means for applying the first digital carrier reference signal to the second digital mixer when the GPS channel system is in an acquisition mode of operation, wherein the switch means includes means for applying the second digital carrier reference signal PRN to the second digital mixer when the GPS channel system is in a tracking mode of operation.

3. A method of improving acquisition of a GPS receiver system during an acquisition mode of operation, comprising the steps of:

hierarchically chaining a plurality of channel circuits in series during acquisition mode, where each channel circuit includes two correlators;

progressively delaying a PRN reference code signal to provide a sequence of progressively delayed PRN reference code signals;

applying one of the sequence of progressively delayed PRN reference code signals to each of said correlators wherein the PRN reference code signal applied to the second correlator of each channel module is delayed further than the PRN reference code signal applied to the first correlator of each channel module;

applying the third delayed PRN reference code signal through a switch to the third correlator when the GPS channel system is in an acquisition mode of operation and when the third correlator is determined to be unused and available for assisting the first and second correlators in acquiring a GPS signal; and applying another PRN reference code signal through the switch to the third correlator when the GPS channel system is in a tracking mode of operation.

4. A method of dynamically allocating otherwise unused correlator channels of a GPS receiver for improving acquisition of a GPS signal, where a correlator channel includes two correlators, comprising the steps of:

providing a local PRN reference code signal;

correlating a digitized received GPS signal with the local PRN reference code signal in a first correlator of a first channel and providing an output signal to a first accumulator;

delaying the local PRN reference code signal to provide a first delayed PRN reference code signal;

correlating the digitized received GPS signal with the first delayed local PRN code signal in a second correlator of the first channel and providing an output signal to a second accumulator;

delaying the first delayed local PRN reference code signal to provide a second delayed PRN reference code signal;

determining that a second channel having a third and a fourth correlator are unused and available for assisting the first and second correlators of the first channel in acquiring a GPS signal;

correlating the digitized received GPS signal with the second delayed local PRN code signal in the third correlator and providing an output signal to a third accumulator;

delaying the second delayed local PRN reference code signal to provide a third delayed PRN reference code signal;

correlating the digitized received GPS signal with the third delayed local PRN code signal in the fourth correlator and providing an output signal to a fourth accumulator;

applying the third delayed PRN reference code signal through a switch to the third correlator when the GPS channel system is in an acquisition mode of operation and when the third correlator is determined to be unused and available for assisting the first and second correlators in acquiring a GPS signal; and applying another PRN reference code signal through the switch to the third correlator when the GPS channel system is in a tracking mode of operation.

5. The method of claim 4 including the steps of:

mixing a digitized IF signal and a digital carrier reference signal to provide the digitized received GPS signal for the first and second correlators; and mixing the digitized IF signal and the digital carrier reference signal to provide the digitized received GPS signal for the third and fourth correlators.

* * * * *